United States Patent [19]
Kennedy

[11] 3,820,852
[45] June 28, 1974

[54] SPOKE MOUNTABLE DISPLAY DEVICE WITH INTEGRAL BRACKET

[75] Inventor: James D. Kennedy, Streamwood, Ill.

[73] Assignee: Beatrice Foods Company, Elgin, Ill.

[22] Filed: June 6, 1973

[21] Appl. No.: 367,404

[52] U.S. Cl.............. 301/37 R, 301/37 S, 40/129 B, 301/37 SA
[51] Int. Cl. ........................... B60b 7/00, G09f 7/00
[58] Field of Search......... 301/37 CM, 37 R, 37 SA, 301/37 S; 40/129 B

[56] References Cited
UNITED STATES PATENTS
| | | | |
|---|---|---|---|
| 751,086 | 2/1904 | Lynn | 40/129 B |
| 2,344,542 | 3/1944 | Fike | 301/37 SA |
| 3,602,550 | 8/1971 | Patane | 301/37 S |

FOREIGN PATENTS OR APPLICATIONS
| | | | |
|---|---|---|---|
| 3,467 | 1893 | Great Britain | 40/129 B |

Primary Examiner—Robert S. Ward, Jr.
Assistant Examiner—Victor N. Sakran
Attorney, Agent, or Firm—Hill, Gross, Simpson, Van Santen, Steadman, Chiara & Simpson

[57] ABSTRACT

A display device for mounting over spokes of a spoked vehicle wheel between hub and rim portions thereof which has an integral bracket assembly requiring only a separate single screw member for mounting on a prechosen wheel spoke. The device further incorporates spoke engaging means which prevent it from revolvably turning about the mounting spoke.

10 Claims, 7 Drawing Figures

PATENTED JUN 28 1974　　　　3,820,852

SPOKE MOUNTABLE DISPLAY DEVICE WITH INTEGRAL BRACKET

BACKGROUND OF THE INVENTION

Spoke mountable display devices, especially reflectors, for mounting upon the spokes of a spoked vehicle wheel between the hub and the rim portions thereof have heretofore been known, but most of such devices require rather elaborate means for so mounting, including especially a variety of small parts which are easily lost or broken or even improperly assembled, especially by an inexperienced person. In addition such prior art devices generally suffer from other serious disadvantages, among which are spoke damage or distortion, excessive weight, cumbersomeness, unattractiveness, tendency to loosen in use, suitably for only a single wheel size or shape or spoke angle, high cost, fragility, etc.

Display devices having an integral mounting assembly and suirable for providing a display surface, especially for reflectors, on both sides of a spoked cycle wheel have been very slow to appear in the art, especially a device of this type which is further adapted for installation on any one of a wide variety of spoke supported and suspended vehicle wheel means. The need in the art for such devices is very great owing to a rapid increase in the desire to mount reflector assemblies on cycle wheel spokes to improve cycle operator safety at night.

BRIEF SUMMARY OF THE INVENTION

The present invention is directed to a simple, economical, display device having an integral bracket assembly and adapted to be highly reliable and further adapted to spoke mounting on a cycle wheel.

A single such integral bracket assembly on a display device of this invention is generally sufficient to achieve a desired mounting of such display device upon a cycle wheel, but two or even three such may be employed if desired, one each adapted to engage a different spoke and separated from one another by the distance between adjacent spokes on a cycle wheel, or a length along a single spoke, as desired.

The display device is characteristically of durable construction and may be readily fabricated from inexpensive materials using inexpensive procedures.

In one form, such a display device is capable of serving as a universal mounting fixture for many different types, sizes, and styles of cycle wheels and of display panels.

The present invention further provides reflectors utilizing a display device as described herein, which reflectors may be easily and simply mounted on a cycle wheel's spokes to produce a stable configuration of superior durability.

Other and further objects, purposes, advantages, utilities, and features will be apparent to those skilled in the art from a reading of the present specification and drawings.

DETAILED DESCRIPTION

Figure 1:
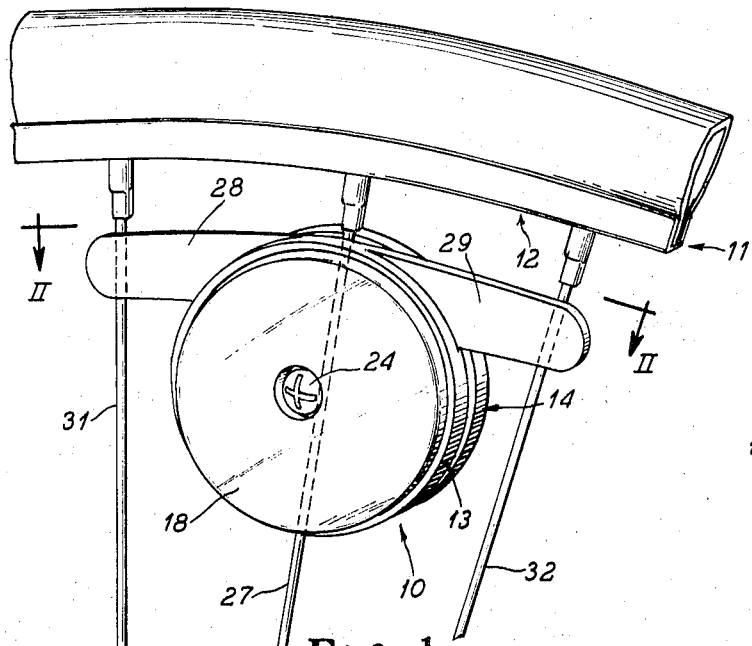
FIG. 1 is a fragmentary view in side elevation of a bicycle wheel having an embodiment of a display device of this invention (here a reflector) mounted on the spokes thereof.
Figure 2:
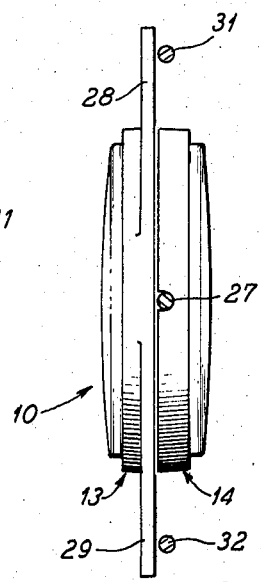
FIG. 2 is a top plan view of the embodiment shown in FIG. 1, some parts of the wheel being shown in section.
Figure 3:
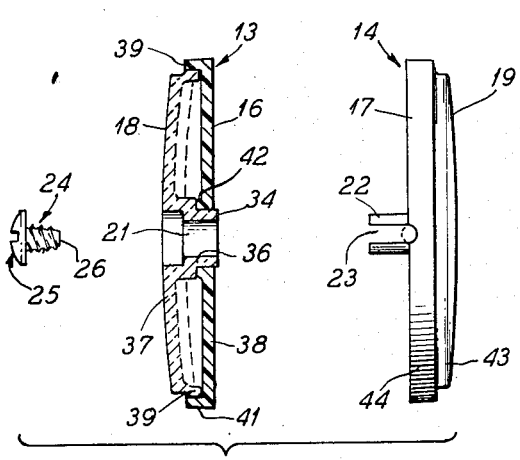
FIG. 3 is an exploded view of the embodiment shown in FIG. 1, some parts thereof shown in section.
Figure 4:
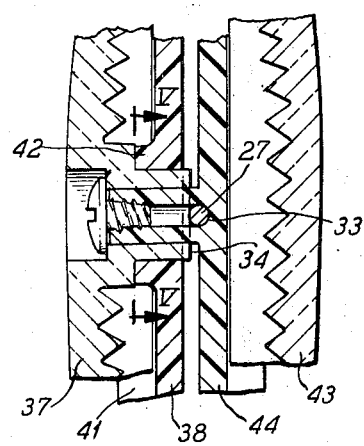
FIG. 4 is an enlarged, fragmentary vertical sectional view through the central region of the embodiment shown in FIG. 1.
Figure 5:
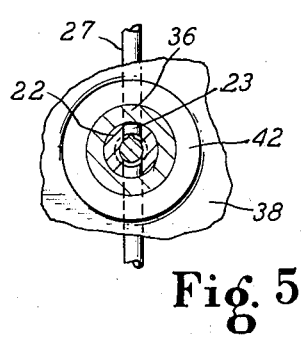
FIG. 5 is an enlarged, fragmentary, horizontal view taken along the line V—V of FIG. 4.

Referring to FIGS. 1-5, there is seen one embodiment of a spoke mountable display device of this invention herein designated in its entirety by the numeral 10 which is shown in FIGS. 1, 2 and 4 in a mounted configuration upon a spoked vehicle wheel 11 adjacent the rim portions 12 thereof. Device 10 incorporates a pair of flattened bodies 13 and 14 adapted to be brought together in adjacent, inside face 16 to inside face 17, respectively, in relationship with the opposed, outside, respective faces 18 and 19 of each body 13 and 14 having a preformed display surface portion (here shown as a reflex reflector). Body 13 has a channel 21 therein extending therethrough from one face 18 to the other 16 thereof. Body 14 has a prong 22 projecting from the inside face 17 thereof, said prong 22 being adapted to make slidable engagement within the channel 21 when the bodies 13 and 14 are in such adjacent relationship. The prong 22 further having a longitudinally extending slot 23 defined therein.

If desired the walls 36 of channel 21 may extend somewhat beyond inside face 16, but it is preferred to have the mount of channel 21 adjacent outside face 18 enlarged for purposes of recessing the head 25 of screw 24 in an assembled device 10.

A screw 24 is provided which has a tapered shank 26 whose diameter is adapted to threadably engage the slot 23.

The relationship in device 10 between channel 21, prong 22, slot 23 and screw 24 is such that when prong 22 is engaged within channel 21, and screw 24 has been turned into slot 23 as shown in FIG. 4, a given first spoke member 27 in the spoked vehicle wheel 11 is clampable between said pair of flattened bodies 13 and 14.

In device 10, spoke engaging means is provided which is adapted to engage or contact at least one other spoke member in wheel 11 and which is further adapted to prevent device 10 when so mounted on spoke 27 from revolvably moving about spoke 27 with spoke 27 acting as an axis. Such a spoke engaging means may take any convenient form. For example, in device 10, the spoke engaging means comprises a pair of wings 28 and 29 which are integral with body 13. Wings 28 and 29 extend in opposite side directions from body 13, and the respective outer flattened end portions of each wing 28 and 29 is adapted to be adjacent to (preferred) or even to engage or abut against surface portions of, the adjacent spoke members 31 and 32 on either side of, and adjacent to, spoke 27. Observe that wings 28 and 29 rest on the same relative side of each of respective spokes 31 and 32. In an alternative embodiment, not shown, the wings 28 and 29 may extend from the same relative side of body 13 with one wing overlying the other in spaced, generally parallel relationship, the spacing between wings being adapted to accomodate a spoke member such as spoke 31, therebetween. For added strength, the wings 28 and 29 may be joined together adjacent body 13 and so spaced apart only at their tip regions. Any convenient wing configuration may be employed, as those skilled in the art will readily appreciate.

The inside face 17 of flattened body 14 is preferably provided with a straight slot or groove 33 which extends thereacross through the base of prong 22 and intersecting the prong slot 23. Slot 33 is adapted to receive a spoke member, such as spoke 27, therein when device 10 is so engaged and mounted thereon. Slot 33 not only provides a relatively extended region for clamping a spoke member such as spoke 27, within and between bodies 13 and 14, but also permits one to bring the bodies 13 and 14 into a close relationship with a minimum of space between faces 16 and 17. In general, it is preferred to so adjust the relative lengths of prong 22 and channel 21, and also of slot 33, so that a spacing exists between bodies 13 and 14 in an assembled device 10, and the shoulder portion 34 of channel 21 rests against spoke 27 and yieldingly comprises spoke 27 with slot or groove 33.

The shape of respective bodies 13 and 14 may be as desired. Thus, for example, the outside face of each body may be square, triangular, elliptical, curved to abut on one edge against a bicycle wheel rim, or the like, as those skilled in the art will readily appreciate. Device 10 represents a presently preferred form wherein the bodies 13 and 14 are circular and have diameters approximately equal to one another. The size of each body 13 and 14 is preferably so chosen as to cause the device 10 to fit over a single spoke, such as spoke 27, and be in spaced relationship to adjacent spokes, such as spokes 31 and 32, of a spoked vehicle wheel 11. In device 10, the channel 21 preferably extends perpendicularly through the center of body 13 and the prong 22 preferably extends perpendicularly from the center of inside face 17 of body 14.

Each body 13 and 14 is preferably formed of two pieces. Since construction of each body 13 and 14 is similar except for channel 21 and prong 22, construction is illustrated by reference to body 13 (see, for example, FIG. 3). A preformed one piece plastic part 37 defines outside face 18 of body 13 and has molded into its inside face the typical conventional hexagonal facets (not shown in plan view herein) associated with molded plastic reflex reflectors, as are well known to those skilled in the art, the plastic part 37 being conveniently and preferably formed of a transparent resin, such as an acrylic resin or the like. Body 37 has molded into its peripheral edge portions an inturned flange 39.

A preformed one piece plastic part 38 defines inside body 16 of body 13 and has molded into its peripheral edge portions an inturned flange 41. The plastic part 38 is conveniently and conventionally formed of an opaque resin such as an acrylonitrile butadiene styrene resin or the like. The diameter of flange 41 is such that the radial outside walls of flange 39 are adapted to be slidably engaged within the radial inside walls of flange 41 in an assembled body 13 of parts 37 and 38.

The walls 36 of channel 21 are formed by part 37 and part 38 is formed so as to have an aperture centrally formed therein and defined by a shoulder 42. The radial inside walls of shoulder 42 are adopted to make slidable engagement with the radial outside surfaces of walls 36 in an assembled body 13 of parts 37 and 38. Central support for part 37 is provided by shoulder 42 in an assembled body 13. In an alternative embodiment, not shown, the walls of channel 21 may be formed by part 38, if desired.

In an assembled body 13, parts 37 and 38 are conveniently bonded together using an adhesive, sonic welding, or the like, as is well known to those familiar with this art.

Body 14 is similarly formed of a transparent plastic part 43 which nests within an opaque plastic part 44.

Figure 6:
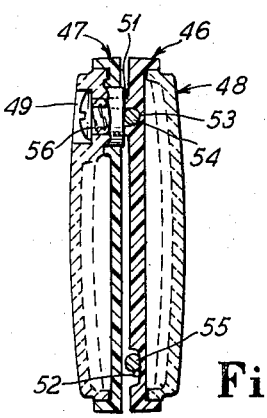
FIG. 6 is a vertical sectional view of another embodiment of a display device of this invention (here a reflector)

Referring to FIG. 6, there is seen another embodiment of a device of this invention, such embodiment being designated in its entirety by the numeral 46. Device 46 incorporates a pair of flattened bodies 47 and 48 adapted to be brought together in an adjacent, inside face to inside face relationship in the same general manner as in device 10. Bodies 47 and 48 are constructed similarly to bodies 13 and 14.

In device 46, channel 49 and slotted prong 51 are radially offset from the center of respective bodies 47 and 48. Device 46 is further equipped with a trough or groove 52 which extends straight across the inside face of body 48 in spaced relationship to the slot or groove 53 in such face which extends through the base of slotted prong 51. The slot 52 is widened along its base portions.

As shown in FIG. 6, when device 46 is mounted with prong 51 engaging a spoke 54, and bodies 47 and 48 are engaged and secured together about spoke 54 with screw 56 turned into slotted prong 51, the slot 52 engages a spoke 55 which is next adjacent spoke 54 in a spoked vehicle wheel (not detailed in FIG. 6). Slot 52 in device 46 thus provides a spoke engaging means which engages spoke and which prevents device 46 from revolvably moving about spoke 53 when device 46 is mounted thereon. The widened base of slot 52 permits same to accomodate a wide variety of spoke angles, configurations and sizes, so that device 46 is adopted for use with many different types of spoked vehicle wheels.

The dotted lines in each of FIGS. 3 and 6 indicate the spatial region occupied by the reflective back surface of a reflector incorporated into respective devices 10 and 46.

Figure 7:
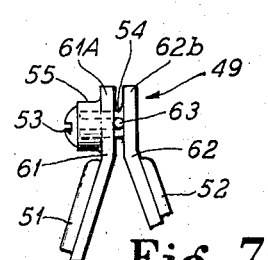
FIG. 7 is a fragmentary side elevational view of another embodiment of a display device of this invention (here a reflector).

Referring to FIG. 7 there is seen another embodiment of a device of this invention, such embodiment being designated in its entirety by the numeral 49. Device 49 incorporates a pair of bodies 61 and 62 which are adapted to mate together at their respective lateral side edge portions about adjacent bicycle spokes 63 (only one being shown in FIG. 7). Fron a side elevational view, each body 61 and 62 is generally triangularly shaped, except at its extreme respective lateral side edge portions where integral tab portions 61A and 62B, respectively, extend side-wise outwardly therefrom. From a top plan view each body 61 and 62 is bent at its mid portion (not shown) convexly outwardly so that reflectors 51 and 52 in each body 61 and 62 are side viewable, there being a pair of reflectors 51 in body 61 and a pair of reflectors 52 in body 62, each individual reflector 51 being inclined at an angle with respect to the other reflectors 51 on body 61 and the same for reflectors 52 on body 62. Each tab 62B (only one tab shown) on body 61 is provided with a prong 54 in the manner of prong 22 in embodiment 10 and each tab 61A (only one tab shown) is provided with a channel 56 in the manner of channel 21 of embodiment 10. The integral bracket assembly formed, as tabs 61A and 62B matingly engage about a spoke 63 are held together by a screw 53, the structure and operation of such integral bracket assembly being as described above, for example, in reference to device 10.

Other and further embodiments and variations of the present invention will become apparent to those skilled in the art from a reading of the present specification taken together with the drawings and no undue limitations are to be inferred or implied from the present disclosure.

The claims are:

1. A display device for mounting over spokes of a spoked vehicle wheel between the hub and the rim portions thereof comprising:
   A. a pair of bodies adapted to be brought together in adjacent, inside face to inside face relationship with the opposed, outside respective faces of each body having a preformed display surface portion,
   B. one of said bodies having a channel therein extending therethrough from one face to the other thereof,
   C. the other of said bodies having a prong projecting from the inside face thereof, said prong being adapted to make slidable engagement with said channel when said bodies are in said adjacent relationship, said prong further having a longitudinally extending slot defined therein,
   D. a screw having a tapered shank whose diameter is adapted to threadably engage said slot,
   E. the relationship between said channel, said prong, said slot, and screw being such that when said prong is engaged with said channel and said screw is turned into said slot, a predetermined first spoke member in a given one of said spoked vehicle wheels is clampable between said pair of flattened bodies, and
   F. spoke engaging means associated with at least one of said bodies and adapted to engage at least one predetermined second spoke member in said given one of said spoked vehicle wheels and further adapted to prevent said device when so engaged about said first spoke member from revolvably moving about said first spoke member.

2. The device of claim 1 wherein said other body has a straight second slot extending across its said inside face with such slot extending through the base of said prong and intersecting said prong slot, said second slot being adapted to receive said predetermined first spoke member therein when said device is so engaged with said predetermined first spoke.

3. The device of claim 1 wherein said bodies are adopted to overlie one spoke in said given spoked vehicle wheel and further wherein a pair of flattened, wing-like members extend sidewise from side portions thereof, the outer flattened end portions of such wing-like members being adapted to be adjacent surface portions of at least one spoke member adjacent said first spoke member in said given spoked vehicle wheel.

4. The device of claim 3 wherein said bodies are circular and said channel and said prong are diametrically located therein.

5. The device of claim 3 wherein said wing members extend in opposite side directions therefrom.

6. The device of claim 3 wherein said wing members extend in a common direction therefrom defining a spaced parallel relationship near their said outer flattened end portions between which a spoke member in said given spoked vehicle wheel adjacent said first spoke member is adapted to extend.

7. The device of claim 3 wherein said opposed, outside respective faces are reflectorized.

8. The device of claim 1 wherein said bodies are adapted to overlie a pair of adjacent spokes in said given spoked vehicle wheel, one of said adjacent spokes being positioned in said prong slot and so clampable between said pair of flattened bodies.

9. The device of claim 8 wherein said bodies are circular and said channel and said prong are radially offset relative to the center portions thereof, and the inside face of said other body has defined therein a pair of slotted regions adapted for receipt therein of said pair of adjacent spokes, the slotted region removed from said prong being widened to accomodate a predetermined variation in spacing between said adjacent spokes.

10. The device of claim 8 wherein said opposed outside respective faces are reflectorized.

* * * * *